(12) United States Patent
Mattila (10) Patent No.: US 6,185,422 B1
(45) Date of Patent: Feb. 6, 2001

(54) METHOD AND APPARATUS FOR TRANSITIONING BETWEEN CONTROL CHANNELS IN A CELLULAR SYSTEM

(75) Inventor: Ilpo Mattila, Redmond, WA (US)

(73) Assignee: Nokia Mobile Phones Ltd, Espoo (FI)

( * ) Notice: Under 35 U.S.C. 154(b), the term of this patent shall be extended for 0 days.

(21) Appl. No.: 09/100,490

(22) Filed: Jun. 19, 1998

(51) Int. Cl.[7] .................................................. H04Q 7/22
(52) U.S. Cl. ........................ 455/434; 455/515; 455/435; 455/552
(58) Field of Search .................. 455/434, 435, 455/455, 552, 515

(56) References Cited

U.S. PATENT DOCUMENTS

| | | | |
|---|---|---|---|
| 5,541,978 | * | 7/1996 | Brunner et al. ....................... 455/423 |
| 5,570,467 | * | 10/1996 | Sawyer ................................ 455/515 |
| 5,722,078 | * | 2/1998 | Przelomiec et al. ................. 455/452 |
| 5,953,665 | * | 9/1999 | Mattila . |
| 5,963,869 | * | 10/1999 | Fehnel ................................ 455/511 |

OTHER PUBLICATIONS

Telecommunications Industry Association/Electronic Industrial Association (TIA/EIA) IS–136. 1–A Standard, Oct. 1996, pp. 89–95, 122–124 and 144.

* cited by examiner

Primary Examiner—Daniel S. Hunter
Assistant Examiner—Alan T. Gantt
(74) Attorney, Agent, or Firm—Brian T. Rivers (57) ABSTRACT

A method and apparatus for transitioning between control channels in a cellular telecommunications system by using adaptive hysterisis. In an embodiment of the invention, when a mobile station attempts to transition from an analog control channel (ACCH) to a digital control channel (DCCH) and subsequently returns to the ACCH, a threshold level of DCCH received signal strength (rssi) at the mobile station that triggers a transition attempt from an ACCH to a DCCH is incrementally increased. Incrementally increasing the threshold level DCCH rssi prevents unnecessary transitions back and forth between an ACCH and a DCCH when the rssi of the DCCH is close to a minimum level that triggers a camp on the DCCH after a synchronization, or when the mobile station cannot synchronize to or camp on the DCCH successfully.

17 Claims, 3 Drawing Sheets

METHOD AND APPARATUS FOR TRANSITIONING BETWEEN CONTROL CHANNELS IN A CELLULAR SYSTEM

FIELD OF THE INVENTION

This invention relates generally to cellular telecommunications networks and, more particularly, to a method and apparatus for transitioning between control channels in a cellular telecommunications system by using adaptive hysterisis.

BACKGROUND OF THE INVENTION

In a cellular telecommunications network, the geographical area covered by the network is divided into cells with groups of one or more cells defining a service area of the network. Each of the cells contains a base station that transmits and receives control information and voice communications to and from mobile stations that are located in the coverage area of the cell. Typically, each of the cells uses a separate control channel for exchanging control information with a mobile station, and a set of voice channels for exchanging voice or data signals (traffic signals) with a mobile station. The type of control channel used in a particular system depends on the system standard. The most popular current cellular networks employ either an analog control channel (ACCH) or a digital control channel (DCCH), or both an analog control channel (ACCH) and a digital control channel (DCCH).

The term ACCH was created to describe a control channel originally developed for use in a system having analog voice channels, although now an ACCH may also be used in a dual mode analog/digital system for control of digital traffic channels. Each ACCH of a system is typically assigned to a set frequency channel. An example of a network using an ACCH would be a cellular network that operates according to the Telecommunications Industry Association/Electronic Industrial Association (TIA/EIA) 553 analog system standard (AMPS). In AMPS, approximately 21 of the 832 available frequency channels are defined for use as ACCHs.

The term DCCH is commonly used to describe a control channel used in a time division multiple access (TDMA) digital cellular system. In a TDMA system, each channel which is broadcasting at a particular frequency is divided into a plurality of time slots. Subscriber communications or control channel signals are converted to digital format and divided into short communication bursts. Each burst is tagged with an identifier, assigned a time slot, and is broadcast in an interleaved fashion with other bursts on the same frequency. At the receiving end, the identifiers are used to reconstruct the entire communication from the individual bursts. An example of a system using a DCCH would be a cellular network operating according to the TIA/EIA IS-136 dual mode standard.

In a cellular system, a control channel must always be available for each mobile station operating within the system. This is necessary so the mobile station always has access to the control information needed to make and receive calls and otherwise to operate correctly in the system. When a mobile station is powered on at an arbitrary location within a cell of the system, the mobile station must initially locate and select a suitable control channel. As the mobile station then roams about the coverage area of the cellular system, it must be able to locate and tune to a control channel of the cells into which it roams. Control channel selection while roaming is typically performed by making measurements on control channels identified in a "neighbor cell list". The neighbor cell list, which identifies the control channels of neighboring cells, is transmitted on the control channel of each cell at certain predetermined intervals. As the mobile station roams, it measures each neighbor cell control channel in the list at predetermined times and tunes to one of the neighbor cell list control channels when the signal strength of the signal received on that control channel becomes greater than the signal strength received from the current control channel. Since the configuration of the cellular system is known, determining the correct control channels for a particular cell's neighbor cell list is a relatively straightforward task.

If a mobile station does not have or has limited or outdated information on the identity of the nearest control channels, the process of locating a suitable control channel may present problems that do not occur when a mobile station has accurate identifying information on available or known neighbor cell control channels. For example, power-up of a mobile station may take place arbitrarily within any cell of the system, so initial control channel selection can also arbitrarily take place within any cell of the system. In the case of initial control channel selection, the mobile station must be capable of selecting a suitable control channel that could be one of any of the whole set of control channels in the system.

The use of DCCHs in a cellular system presents some problems in the control channel selection process that do not commonly occur when only ACCHs are used and when a DCCH is preferred for use in the cellular system. Since an ACCH is typically assigned to a fixed frequency in a cellular network, the frequency channels can be known at the mobile station. In an AMPS network, for example, at least one of these 21 frequency channels assigned as control channels in the AMPS standard is used in each base station of the network. It is a relatively simple task for the mobile station to scan and measure the 21 frequencies at certain times, during power-up for example, to determine the control channel with the strongest received signal strength at the mobile station and tune to that frequency channel. That control channel would normally be the ACCH of the cell in which the mobile station is located. The mobile station does not need to know the control channel of the cell in which it was located or the neighbor cell list of that cell before power-up in order to quickly locate a control channel. DCCHs on the other hand are configured as a certain time slot or set of time slots on a frequency channel in a TDMA system, and for flexibility it is common to allow assignment of a DCCH to any one of a large number of frequency channels, possibly the whole range of frequency channels available to the base stations in the network. For example, in an IS-136 system, the DCCHs assigned to the various base stations could be on any network frequency channel in the first and fourth time slots. During control channel selection, a mobile station may have to scan the whole range of frequencies in order to locate and select a DCCH. This process could take a considerable period of time.

Different techniques have been developed for DCCH selection in situations such as power-up. Several solutions are included in the reference model process described in the IS-136 standard (IS-136.1-A, Appendix D). In this process, a mobile station initially tunes to the last-used DCCH or tunes to a strongest DCCH chosen from a number of last-used DCCHs. The mobile then synchronizes to the DCCH and determines if the signal strength and service criteria are satisfied on that DCCH. If the criteria are satisfied, the mobile station then camps on the DCCH. When camped on the DCCH, the mobile station monitors that DCCH for messages from the system and also can initiate calls on the DCCH. If the signal strength and service criteria are not satisfied, the mobile station repeats the process on the next strongest last-used DCCH if more than one DCCH identifier is stored. If an acceptable last-used DCCH cannot be found, the mobile station initiates a scan of the ACCHs of the system and tunes to the best acceptable ACCH that is found. If an ACCH is found, the mobile station monitors the ACCH and may receive a DCCH pointer that identifies a DCCH in the control channel information message of the ACCH. If a DCCH pointer is received, the mobile station performs the IS-136 control channel selection procedure on the DCCH identified by the pointer. If no DCCH pointer is received on the ACCH or if the DCCH pointed to does not meet the control channel selection procedure criteria, the mobile station registers on the ACCH. If the mobile station is unable to find an ACCH, it performs a band scan of the entire system band. The mobile station then finds the strongest RF channel in the band. If the strongest RF channel includes a DCCH, the mobile station performs the IS-136 control channel selection procedure and camps on the DCCH if the selection criteria are satisfied. If a DCCH is found but the selection criteria are not satisfied on the RF channel having the strongest received signal strength (rssi) at the mobile station, the mobile station receives a neighbor cell list from the DCCH and attempts to locate an acceptable neighbor DCCH for camping. If a DCCH is not found on the current RF channel, the mobile station will look for a digital traffic channel (DTC) on the current RF channel carrying coded digital control channel locator (CDL) information. If CDL information is found, the mobile station attempts to find a DCCH that meets selection criteria from the CDL information, starting with the strongest DCCH. If need be, the mobile station will check all DCCHs identified in the CDL. If no DCCH is located from the strongest RF channel, the mobile station selects the next strongest RF channel and repeats the process for each RF channel, continuing until all channels of suitable signal strength have been evaluated. If no DCCH is found from the RF channel search, the mobile station will perform a search on an alternate system band or start the process again.

A mobile station may transition, or perform unnecessary access attempts, transitioning back and forth between the idle state on an ACCH and camping on a DCCH multiple times when operating in an IS-136 system. This may occur in the above situation, for example, when the DCCH pointed to by an ACCH pointer does not meet DCCH selection criteria and the mobile station registers back on the ACCH after failing to camp on the DCCH. In this situation, a received signal strength threshold, originally set to the predefined received signal strength (rssi) threshold, is set to a value defined as RSS_ACC_MIN and held at that level, so that access is not attempted to a DCCH from the ACCH unless the measured rssi of the DCCH meets the threshold RSS_ACC_MIN. In this situation, if the rssi of a DCCH has a value near the threshold RSS_ACC_MIN, the mobile station may attempt to access the DCCH and fail to camp on the DCCH, or fall back to an ACCH soon after camping on the DCCH due to weak signal strength on the DCCH. This could be repeated over and over.

If the mobile station frequently and unnecessarily moves back and forth between an ACCH and a DCCH, the mobile station may miss incoming calls, and power consumption will be higher than if the mobile station stays camped on a DCCH or idle on an ACCH.

OBJECTIVES OF THE INVENTION

It is, therefore, an object of the invention to provide a method and system for transitioning between control channels in a cellular system that overcomes the foregoing and other problems.

Another object of this invention is to provide a method and apparatus for transitioning between control channels by using adaptive hysteresis in a cellular telecommunications system.

A further object of this invention is to provide a method and apparatus for transitioning between an analog control channel (ACCH) and a digital control channel (DCCH), wherein adaptive hysterisis is utilized to adjust a threshold power level for transition in order to prevent unnecessary and unsuccessful attempts to transition to a DCCH from an ACCH.

SUMMARY OF THE INVENTION

The present invention provides a method and apparatus for transitioning between control channels by using adaptive hysterisis to adjust transition threshold levels in a cellular telecommunications system. The method and apparatus prevents unnecessary transition attempts by adaptively adjusting a threshold decision level according to system conditions and transition attempt history, where the threshold decision level is used for triggering transitions between control channels.

In an embodiment of the invention, the method and apparatus is implemented into a cellular system in which a cell may have at least two types of control channels, where a first type of control channel is preferred over a second type of control channel for use by a mobile station.

In the embodiment, transition attempts from a control channel of the first type to a control channel of the second type are initiated depending on a received signal strength level of the control channel of the second type at the mobile station. After initially accessing a control channel of the first type, if the received signal strength (rssi) of the control channel of the second type is greater than an rssi threshold level, an attempt is made to transition to the control channel of the second type. The rssi threshold level is set at a predefined initial value. If the attempt to acquire the control channel of the second type is unsuccessful, the rssi threshold level is increased by a step increment, and the mobile station returns to a control channel of the first type.

If the attempt to access the control channel of the second type is successful, a determination is made as to whether the rssi of the control channel of the second type is greater than or equal to a predetermined minimum value for access. The predetermined minimum value for access may be set greater than the initial value. If the rssi level of the control channel of the second type is greater than or equal to the predefined minimum value for access, the mobile station begins monitoring the control channel of the second type until certain predetermined criteria fall below acceptable levels. If the mobile station has been monitoring the control channel of the second type for longer than a predetermined time period, the mobile station increases the rssi threshold level by a hysteresis step increment and returns to a control channel of the first type. If the mobile station has not been monitoring the control channel for longer than the predetermined time period, the mobile station returns to a control channel of the first type without incrementing the rssi threshold level.

If the rssi of the control channel of the second type is less than the minimum value for access, the mobile station increases the rssi threshold level to the predefined minimum value, returns to a control channel of the first type, and does not begin to monitor the control channel of the second type.

The mobile station may return to the same control channel of the first type that was previously accessed, or the mobile station may return to a control channel of the second type that was not previously accessed. After returning to a control channel of the first type not previously accessed, the rssi threshold level is set again at the initial value, and the process begins as it does following an initial access of a control channel of the first type. After returning to a previously accessed control channel of the first type, the process may be repeated in essentially the same manner, with the rssi threshold level, as set by the latest iteration of the process.

On a second or subsequent iteration of the process, if the mobile station successfully acquires a control channel of the second type and the rssi of the control channel of the second type is less than the minimum value for access, the mobile station again returns to a control channel of the first type, while increasing the rssi threshold level by the step increment, if the rssi threshold level is greater than the minimum level, or setting the rssi threshold to the minimum level, if the rssi threshold level is less than the minimum level.

DETAILED DESCRIPTION OF THE INVENTION

Figure 1:
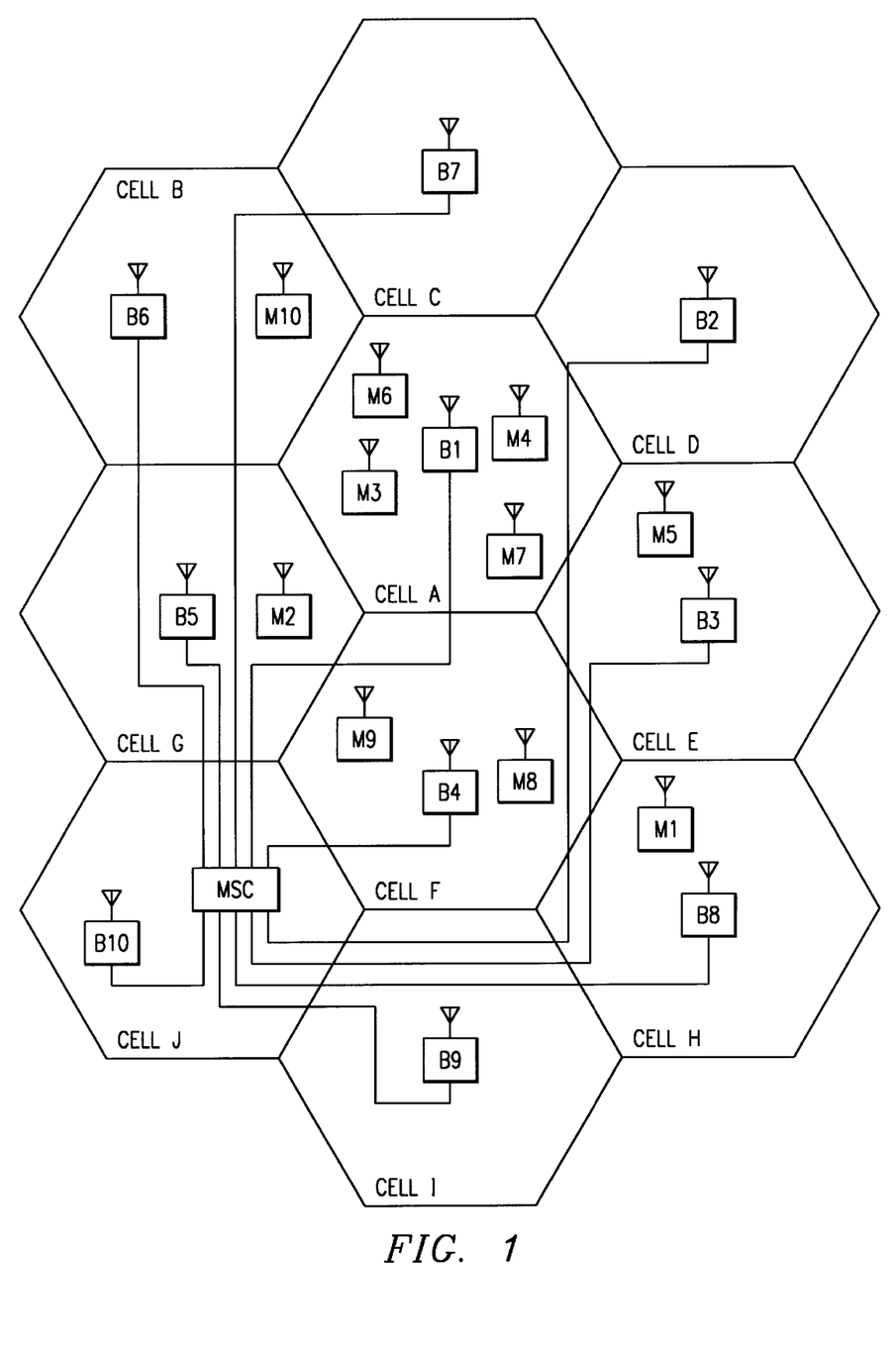
FIG. 1 shows a portion of a cellular telecommunications system to which the present invention generally pertains.

Referring now to FIG. 1, therein is shown a portion of a cellular radio communication system of the type to which the present invention generally pertains. In FIG. 1, an arbitrary geographic area may be divided into a plurality of contiguous radio coverage areas, or cells Cell A–Cell J. While the system of FIG. 1 is illustratively shown to include only ten cells, it should be clearly understood that in practice the number of cells may be much larger.

Associated with, and located within, each of Cell A–Cell J is a base station designated as a corresponding one of a plurality of base stations B1–B10. Each of the base stations B1–B10 includes a transmitter, a receiver, and a base station controller as are well known in the art. In FIG. 1, the base stations B1–B10 are illustratively located at the center of each of Cell A–Cell J, respectively, and are equipped with omnidirectional antennas. However, in other configurations of the cellular radio system, the base stations B1–B10 may be located near the periphery or otherwise away from the center of Cell A–Cell J and may illuminate Cell A–Cell J with radio signals either omnidirectionally or directionally. Therefore, the representation of the cellular radio system of FIG. 1 is for purposes of illustration only and is not intended as a limitation on the possible implementations of the cellular radio system within which the present invention is implemented.

With continuing reference to FIG. 1, a plurality of mobile stations M1–M10 may be found within Cell A–Cell J. Each of the mobile stations M1–M10 includes a transmitter, a receiver, and a mobile station controller as are well known in the art. Again, only ten mobile stations are shown in FIG. 1, but it should be understood that the actual number of mobile stations may be much larger in practice and will invariably greatly exceed the number of base stations.

Moreover, while none of the mobile stations M1–M10 may be found in some of Cell A–Cell J, the presence or absence of the mobile stations M1–M10 in any particular one of Cell A–Cell J should be understood to depend in practice on the individual desires of the mobile stations M1–M10 that may roam from one location in the cell to another or from one cell to an adjacent cell or neighboring cell, and even from one cellular radio system to another such system.

Each of the mobile stations M1–M10 is capable of initiating or receiving a telephone call through one or more of the base stations B1–B10 and a mobile station switching center (MSC). The mobile station switching center (MSC) is connected by communication links, e.g., cables, to each of the illustrative base stations B1–B10 and to the fixed public switched telephone network (PSTN), now shown, or a similar fixed network which may include an integrated services digital network (ISDN) facility. The relevant connections between the mobile station switching center (MSC) and the base stations B1–B10 or between the mobile station switching center (MSC) and the PSTN or ISDN are not completely shown in FIG. 1 but are well known to those of ordinary skill in the art. Similarly, it is also known to include more than one mobile station switching center in a cellular radio system and to connect each additional mobile station switching center to a different group of base stations and to other mobile station switching centers via cable or radio links.

The MSC may control the administration of communication between each of the base stations B1–B10 and the mobile stations M1–M10 in communication with it. As a mobile station roams about the system, the mobile station registers its location with the system through the base stations that control the area in which the mobile station is located. When the mobile station telecommunications system receives a call addressed to a particular mobile station, a paging message addressed to that mobile station is broadcast on control channels of the base stations which control the area in which the mobile station is believed to be located. Upon receiving the paging message addressed to it, the mobile station sends a page response to the base station. The process is then initiated to create the call connection. The MSC controls the paging of a mobile station believed to be in the geographic area served by its base stations B1–B10 in response to the receipt of a call for that mobile station, the assignment of radio channels to a mobile station by a base station upon receipt of a page response from the mobile station, as well as the handoff communications with a mobile station from one base station to another in response to the mobile station traveling through the system, from cell to cell, while communication is in progress.

Each of Cell A–Cell J is allocated a plurality of voice or speech channels and at least one control channel, such as an analog control channel (ACCH) and/or a digital control channel (DCCH). The control channel is used to control or supervise the operation of mobile stations by means of information transmitted to and received from those units. Such information may include call originations, page signals, page response signals, location registration signals and voice channel assignments.

Figure 2:
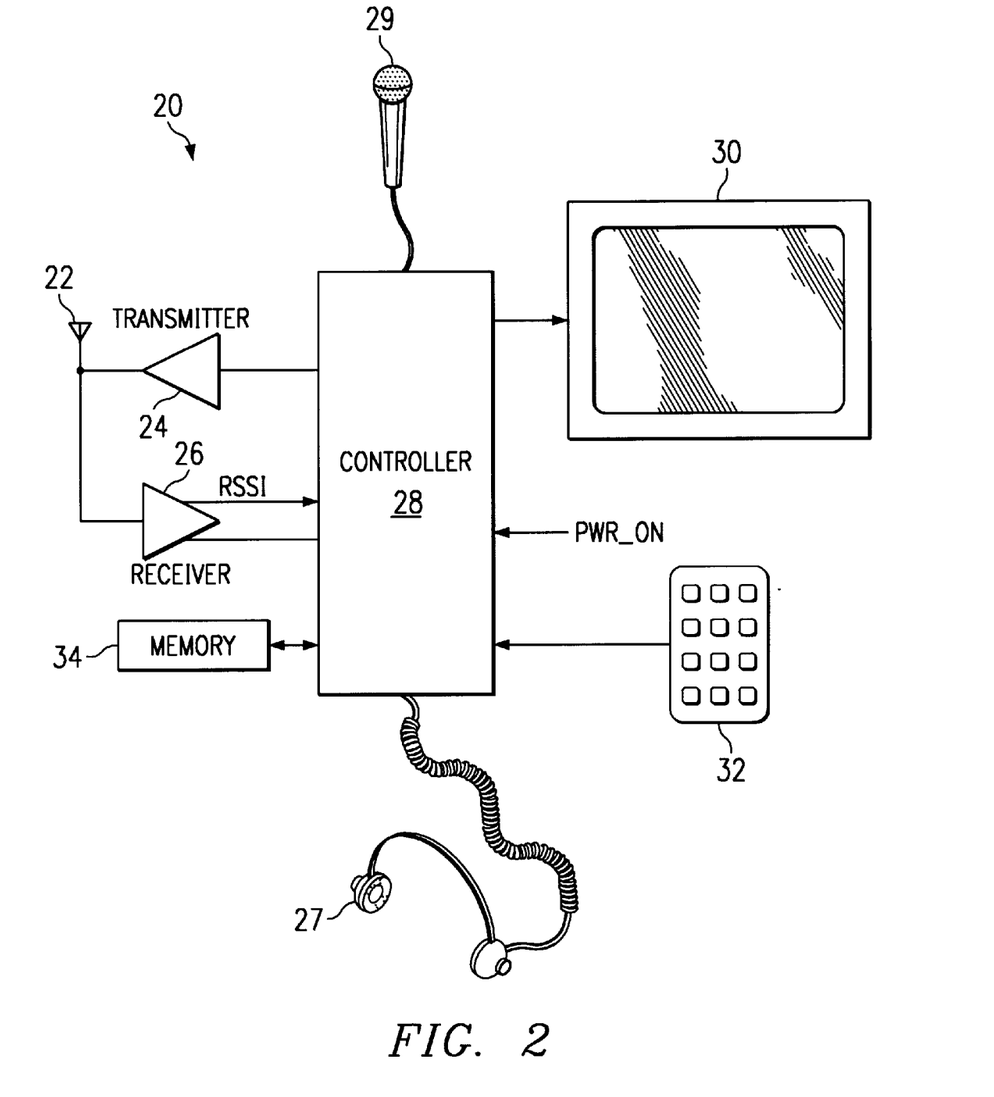
FIG. 2 is a block diagram of a mobile station for performing control channel transition according to an embodiment of the invention.

Referring now to FIG. 2, therein is a block diagram of a mobile station that is constructed and operated in accordance with this invention. Mobile station 20 may be implemented as any of the mobile stations M1–M10 of FIG. 1. Mobile station 20 includes an antenna 22 for transmitting signals to and receiving signals from a base station, such as base stations B1–B10 of the cellular system of FIG. 1. Mobile station 20 includes a transmitter 24, a receiver 26, and a controller 28. Controller 28 provides control signals to transmitter 24 and receiver 26 and also receives signals from receiver 26 and inputs signals to transmitter 24 for transmission to the network. These signals include signaling information in accordance with the air interface of the cellular system and also user and/or user-generated data. Receiver 26 also includes circuitry capable of measuring signal strength on received signals and sending a received signal strength indication (rssi) signal to controller 28.

A user interface includes a conventional earphone 27, a conventional microphone 29, a display 30, and a user input device, typically a keypad 32, each of which is coupled to controller 28. Mobile station 20 also includes various memories, shown collectively as memory 34, wherein are stored a plurality of constants and variables that are used by the controller 28 during the operation of mobile station 20. For example, memory 34 stores the values of various cellular system parameters and the number assignment module (NAM). An operating program for controlling the operation of controller 28 is also stored in memory 34 (typically in a ROM device). The operating program includes routines and procedures for controlling transitioning of mobile station 20 between control channels according to the invention. Memory 34 also stores data, including messages that are received from a cellular network prior to processing of the messages by controller 28.

It should be understood that mobile station 20 can be capable of operating with one or more air interface standards, modulation types, and access types. For example, mobile station 20 may be capable of operating in accordance with the TIA/EIA IS-136 dual mode standard, in which the frequency modulated (FM), frequency division multiple access (FDMA) transmission and reception of TIA/EIA-553 (AMPS) is used for analog mode, and the time division multiplexing (TDMA) transmission and reception of IS-136 is used for digital mode. Mobile station 20 may also be capable of operating with any of a number of other multi mode analog/digital or single mode digital standards that utilize control channels, such as GSM or GSM-based PCS 1900. In general, the teaching of this invention applies to any mobile station that operates within a cellular system having multiple control channels, such as ACCHs or DCCHs, where they may be assigned to at least one frequency channel or to at least one of a plurality of time slots on one of a plurality of frequency channels of the cellular system. It should also be clear that the teaching of this invention is not to be construed to be limited to any one particular type of mobile station or air interface standard, or any particular types of control channels.

In an embodiment of the invention, the method and system is implemented into a cellular system similar to that shown in FIG. 1, which operates according to the IS-136 standard. In the embodiment, the operating program in memory 34 includes routines for selecting a control channel for operation of mobile station 20 in a cellular system such as cellular system 100 of FIG. 1. This includes routines for implementing the method described below in relation of FIG. 3.

Figure 3:
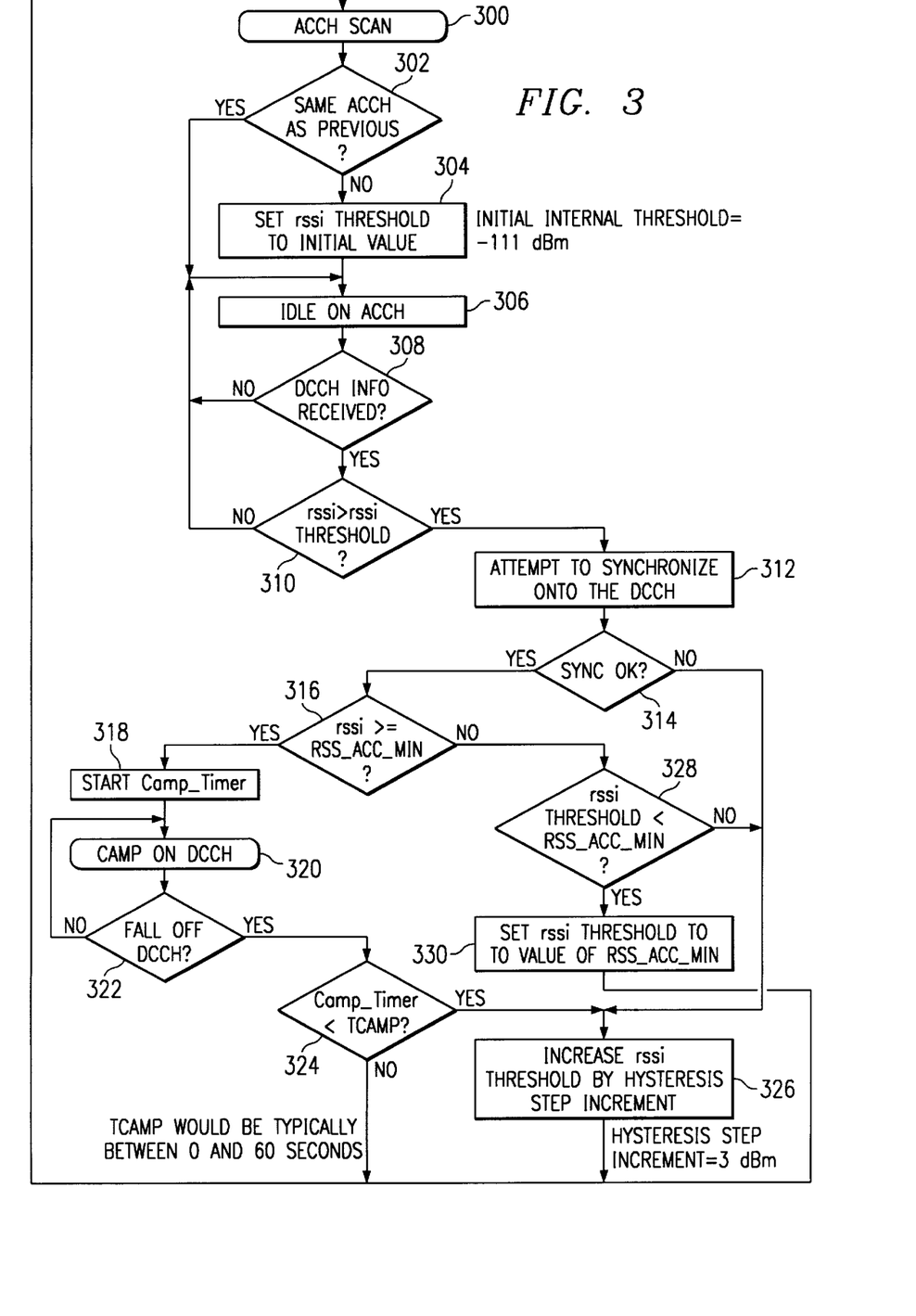
FIG. 3 is a flow diagram showing process steps performed when transitioning between control channels according to an embodiment of the invention.

Referring now to FIG. 3, therein is a flow diagram showing process steps according to the embodiment of the invention. FIG. 3 illustrates process steps that are performed within mobile station 20, as mobile station 20 operates within the cellular system of FIG. 1. The process of FIG. 3 may be initially entered whenever mobile station 20 has begun an initial ACCH scan at step 300. The initial ACCH scan of step 300 may be initiated when mobile station 20 has been initially powered up within the cellular system of FIG. 1. The initial ACCH scan of step 300 may also be initiated after release of a call or during a periodic ACCH rescan. A periodic rescan may be initiated when the mobile station has remained idle on an ACCH for a certain predetermined period of time.

At step 300, controller 28 initiates an ACCH scan through receiver 226. In the ACCH scan, controller 28 scans and selects an ACCH to access based on rssi data from receiver 226. The accessed ACCH may be the ACCH having the strongest rssi as measured at receiver 226. Next, at step 302, controller 28 determines if the chosen ACCH is the same ACCH as was previously accessed. After an initial scan at step 300, no previously accessed ACCH will be identified, and, therefore, the process will move to step 304.

At step 304, controller 28 sets an rssi threshold level to a predefined initial value. The predefined initial value may be, for example, −111 dBm. Next, the process moves to step 306 where mobile station 20 goes idle on the chosen ACCH and monitors the ACCH for system control commands or messages. These messages may include information on available system DCCH or DCCHs available for use by mobile station 20. While the process is in the idle state of step 306, the process will move to step 308 at predetermined times, where controller 28 determines whether DCCH locator information has been received on the ACCH. If no DCCH information has been received, the process moves back to the idle state of step 306. If, however, at step 308, controller 28 determines that DCCH information has been received on the ACCH, the process moves to step 310. At step 310, controller 28 initiates measurement of the rssi of the DCCH (or DCCHs) that was indicated by the DCCH information at receiver 226 and determines whether the DCCH (or the DCCH of DCCHs having the strongest rssi) has an rssi greater than the rssi threshold level. If it is determined that the rssi is not greater than the rssi threshold level, the process returns to step 306, and the mobile station 20 remains idle on the ACCH. If, however, at step 310, it is determined that the DCCH (or the DCCH of the DCCHs having the strongest rssi) has an rssi greater than the rssi threshold level, the process moves to step 312.

At step 312, controller 28 initiates an access attempt on the DCCH which was determined to have an rssi greater than the rssi threshold level by attempting to synchronize to the DCCH. Next, at step 314, determination is made by controller 28 as to whether or not the synchronization attempt was successful. If it is determined that the synchronization attempt was not successful, the process moves to step 326. At step 326, controller 28 increases the rssi threshold level by a hysterisis step increment. The step increment may be, for example, 3 dBm. After the rssi threshold level is incremented, the process returns to step 300. Step 300 will then be repeated to perform an ACCH scan subsequent to the initial ACCH scan. If, however, at step 314 it is determined that the synchronization attempt to the DCCH was successful, the process moves to step 316.

At step 316, controller 28 determines whether the rssi of the DCCH to which mobile station 20 has synchronized in step 312 is greater than or equal to a predefined minimum value for access (RSS__ACC__MIN). If it is determined that the rssi of the DCCH is not greater than or equal to RSS__ACC__MIN, the process moves to step 328. At step 328, controller 28 determines whether the rssi threshold level is less than RSS__ACC__MIN. If the rssi threshold level is less than RSS__ACC__MIN, the process moves to step 330. At step 330, controller 28 sets the rssi threshold level to RSS__ACC__MIN and returns to step 300. Step 300 will then be repeated to perform an ACCH scan subsequent to the initial ACCH scan. Steps 328 and 330 assure that the mobile station does not attempt to camp after successful synchronization on a DCCH when the rssi of the DCCH is less than the predefined value RSS_ACC_MIN. If, however, at step 328, it is determined that the rssi threshold level is not less than RSS_ACC_MIN, the process moves to step 326. At step 326, controller 28 increases the rssi threshold level by a hysterisis step increment. After the rssi threshold level is incremented, the process returns to step 300. Step 300 will then be repeated to perform an ACCH scan subsequent to the initial ACCH scan.

If, however, at step 316, it is determined that the rssi of the DCCH is greater than or equal to RSS_ACC_MIN, the process moves to step 318. At step 318, controller 28 starts a Camp Timer. Next, at step 320, controller 28 initiates camping by mobile station 20 on the chosen DCCH. While camping on the chosen DCCH of step 322, mobile station 20 monitors the DCCH for messages directed to mobile station 20. Also, at predetermined times, controller 28 determines whether mobile station 20 has fallen off the DCCH. If mobile station 20 has not fallen off the DCCH, the process returns to step 320 and continues camping on the DCCH. If, however, at step 322, controller 28 determines that mobile station 20 has fallen off the chosen DCCH, the process moves to step 324. At step 324, controller 28 determines whether the Camp Timer started at step 318 has a value less than Tcamp. Tcamp is a predetermined time value that may have, for example, a value between 0 and 60 seconds. If the Camp Timer does not have a value less than Tcamp, the process moves to step 300. Step 300 is then repeated to perform an ACCH scan subsequent to the initial ACCH scan.

If, however, at step 324, it is determined that the Camp Timer has a value less than Tcamp, the process moves to step 326. At step 326, controller 28 increases the rssi threshold level by a hysterisis step increment. After the rssi threshold level is incremented, the process returns to step 300. Step 300 will then be repeated to perform an ACCH scan subsequent to the initial ACCH scan.

After initial entry of the process of FIG. 3 and initial ACCH scan, the process will be repeated as mobile station 20 attempts unsuccessfully to find a DCCH and returns to step 300 or successfully finds a DCCH and returns to step 300 after falling off the DCCH. The incrementing step of 326 prevents mobile station 20 from transitioning back and forth between an ACCH and a DCCH having an rssi at a level close to RSS_ACC_MIN, or a DCCH on which it is difficult to camp or to which it is difficult to synchronize.

Each time a new ACCH is located and chosen at scan step 300, the rssi threshold level is reset to its predetermined initial value. This allows mobile station 20 potentially to attempt synchronization and camping with a new DCCH or DCCHs, not identified in the DCCH information from the previous ACCH, using the rssi threshold level at its predetermined initial value rather than an incremented and increased value.

While the embodiment of the invention shown in FIG. 3 has been described in the context of an ISI-136 type cellular system, the method and apparatus of the invention has application to any type of cellular system in which a mobile station makes attempts to transition from a control channel of a first type to a control channel of a second type. Additionally, other types of measurement parameters, such as bit error rate (BER) measurements, could be used at various steps in the process to make decisions.

Thus, while the invention has been particularly shown and described with respect to a preferred embodiment thereof, it will be understood by those skilled in the art that changes to form and details may be made therein without departing from the scope and spirit of the invention.

What is claimed is:

1. In a telecommunications system having at least one base station transmitting on a plurality of control channels and at least one mobile station, a method of transitioning a mobile station between control channels, said method comprising the steps of:
   (a) scanning and selecting a control channel of a first type at the mobile station;
   (b) receiving identifying information over said control channel of a first type, said identifying information including information identifying a control channel of a second type, wherein said control channel of a second type is preferred over said control channel of a first type for operation of the mobile station in the system;
   (c) determining if a measurement parameter at the mobile station on said control channel of a second type is greater than a threshold level for triggering transition from said control channel of a first type to said control channel of a second type;
   (d) performing, in response to a positive determination in said step of determining, an access attempt on said control channel of a second type; and
   (e) if said access attempt is unsuccessful, incrementing said threshold level by a step increment and repeating steps (a)–(e) until said access attempt in step (d) is successful or until said mobile station otherwise is required to move off said control channel of a first type.

2. The method of claim 1, wherein, if said access attempt is successful, said method further comprises the steps of:
   starting a timer;
   monitoring said control channel of a second type;
   falling off said control channel of a second type and stopping said timer in response to falling off;
   determining whether said timer has a value less than a predetermined time duration; and
   if it is determined that said timer has a value less than said predetermined time duration, incrementing said rssi threshold level by said step increment and repeating steps (a)–(e) until said access attempt of step (d) is successful or until said mobile station otherwise is required to move off said control channel of a first type;
   else, if it determined that said timer does not have a value less than said predetermined time duration, moving back to step (a) without incrementing said rssi threshold level by said step increment, and repeating steps (a)–(e) until said access attempt of step (d) is successful or until said mobile station is otherwise required to move off said control channel of a first type.

3. The method of claim 2, wherein said control channel of a first type comprises an analog control channel (ACCH) and said control channel of a second type comprises a digital control channel (DCCH), and wherein said step of performing an access attempt on said control channel of a second type comprises performing a synchronization attempt on said DCCH, and further wherein said step of monitoring said control channel of said second type comprises camping on said DCCH.

4. The method of claim 1, wherein said step of scanning and selecting comprises the steps of:
   (a1) determining whether said control channel of a first type was selected in a previous iteration of step (a);
   (a2) and, if said control channel of a first type was not previously selected, setting a threshold level to a predetermined initial value;

(a3) else, if said control channel of a first type was previously selected, continuing to step (c) without setting said threshold to said predetermined initial value; and wherein said step (c) comprises determining if a measurement parameter at said mobile station on said control channel of a second type is greater than said threshold level.

5. The method of claim 4, wherein said step of performing an access attempt, in response to a positive determination in said step of determining, comprises the steps of:

determining if said measurement parameters at the mobile station on said control channel of a second type and said threshold level are both less than a predetermined access threshold level;

and, if said measurement parameter at the mobile station on said control channel of a second type and said threshold level are not both less than said predetermined access threshold level, not accessing said control channel of a second type.

6. The method of claim 1, wherein said measurement parameter at said mobile station on said control channel of a second type comprises a received signal strength indication (rssi).

7. In a telecommunications system having at least one base station transmitting on a plurality of control channels, including an analog control channel (ACCH) and at least one digital control channel (DCCH), and at least one mobile station, a method of transitioning a mobile station between control channels, said method comprising the steps of:

moving into an idle state on an ACCH;

receiving identifying information over said ACCH, said identifying information including information identifying at least one DCCH, wherein said at least one DCCH is preferred over said ACCH for operation of the mobile station in the system;

determining if a measurement parameter on said at least one DCCH at said mobile station is greater than a threshold level for triggering transition from said ACCH to said at least one DCCH; and performing, in response to a positive determination in said step of determining, successive access attempts on said at least one DCCH by repeating the steps of moving onto, receiving, determining and performing access attempts, and for each unsuccessful access attempt incrementing said threshold level by a step increment and returning to said idle state on said ACCH, said successive access attempts performed until said measurement parameter on said at least one DCCH is less than said threshold level.

8. The method of claim 7, wherein said step of performing access attempts comprises attempting to synchronize to said DCCH.

9. The method of claim 7, wherein said step of performing access attempts comprises attempting to camp on said DCCH.

10. In a telecommunications system having at least one base station transmitting on a plurality of control channels and at least one mobile station, an apparatus for transitioning a mobile station between control channels, said apparatus comprising:

(a) means for scanning and selecting a control channel of a first type at the mobile station;

(b) means for receiving identifying information over said control channel of a first type, said identifying information including information identifying a control channel of a second type, wherein said control channel of a second type is preferred over said control channel of a first type for operation of the mobile station in the system;

(c) means for determining if a measurement parameter at the mobile station on said control channel of a second type is greater than a threshold level for triggering transition from said control channel of a first type to said control channel of a second type;

(d) means for performing, in response to a positive determination in said means for determining, an access attempt on said control channel of a second type;

(e) means, if said access attempt is unsuccessful, for incrementing said threshold level by a step increment; and (f) means for causing elements (a)–(e) to repeat the functions of scanning and selecting, receiving identifying information, performing an access attempt, and incrementing said threshold level until said access attempt performed by said means for performing an access attempt is successful or until said mobile station otherwise is required to move off said control channel of a first type.

11. The method of claim 10, wherein said means for performing an access attempt further comprises:

means for starting a timer upon acquiring said control channel of a second type;

means for monitoring said control channel of a second type;

means for stopping said timer in response to falling off said control channel of a second type;

means for determining whether said timer has a value less than a predetermined time duration, in response to stopping said timer; and means, if it is determined that said timer has a value less than said predetermined time duration, for incrementing said rssi threshold level by said step increment; and means for causing elements (a)–(e) to repeat the functions of scanning and selecting, receiving identifying information, performing an access attempt and incrementing said threshold level until said access attempt performed by said means for performing an access attempt is successful or until said mobile station otherwise is required to move off said control channel of a first type.

12. The method of claim 11, wherein said method further comprises:

(a1) means for determining whether said control channel of a first type has been selected by element (a) at least two consecutive times; and (a2) means, if said control channel of a first type was not selected by element (a) at least two consecutive times, for setting a threshold level to a predetermined initial value.

13. The apparatus of claim 11, wherein said control channel of a first type comprises an analog control channel (ACCH) and said control channel of a second type comprises a digital control channel (DCCH), and wherein said means for performing an access attempt on said control channel of a second type comprises means for performing a synchronization attempt on said DCCH, and further wherein said means for monitoring said control channel of said second type comprises means for camping on said DCCH.

14. The apparatus of claim 10, wherein said measurement parameter at said mobile station on said control channel of a second type comprises a received signal strength indication (rssi).

15. In a telecommunications system having at least one base station transmitting on a plurality of control channels, including an analog control channel (ACCH) and at least one digital control channel (DCCH), and at least one mobile station, an apparatus for transitioning a mobile station between control channels, said apparatus comprising:

means for maintaining an idle state on an ACCH;

means for receiving identifying information over said ACCH, said identifying information including information identifying at least one DCCH, wherein said at least one DCCH is preferred over said ACCH for operation of the mobile station to the system;

means for determining if a measurement parameter on said at least one DCCH at said mobile station is greater than a threshold level for triggering transition from said ACCH to said at least one DCCH;

means for performing, in response to a positive determination in said means for determining, successive access attempts on said at least one DCCH according to said identifying information received by said means for receiving and according to said determination performed in said means for determining, and for each unsuccessful access attempt incrementing said threshold level by a step increment and returning to said idle state on said ACCH, said successive access attempts performed until said determination performed by said means for determining indicates said measurement parameter on said at least one DCCH is less than said threshold level.

16. The apparatus of claim 15, wherein said means for performing access attempts comprises means for attempting to synchronize to said DCCH.

17. The apparatus of claim 16, wherein said means for performing access attempts comprises means for attempting to camp on said DCCH.

* * * * *